(12) United States Patent
Kim

(10) Patent No.: US 11,507,320 B2
(45) Date of Patent: Nov. 22, 2022

(54) USB BASED CLOUD DISK AND DISK SEGMENT MANAGEMENT SYSTEM

(71) Applicants: Chong Ho Kim, Gimpo-si (KR); OpenBoxLab Inc., Gimpo-si (KR)

(72) Inventor: Chong Ho Kim, Gimpo-si (KR)

(73) Assignees: Chong Ho Kim, Gyeonggi-Do (KR); OPENBOXLAB INC., Gyeonggi-Do (KR)

( * ) Notice: Subject to any disclaimer, the term of this patent is extended or adjusted under 35 U.S.C. 154(b) by 2 days.

(21) Appl. No.: 17/237,066

(22) Filed: Apr. 22, 2021

(65) Prior Publication Data

US 2021/0294532 A1 Sep. 23, 2021

Related U.S. Application Data

(63) Continuation-in-part of application No. PCT/KR2019/013969, filed on Oct. 23, 2018.

(30) Foreign Application Priority Data

Oct. 24, 2018 (KR) .................. 10-2018-0127235

(51) Int. Cl.
G06F 3/06 (2006.01)

(52) U.S. Cl.
CPC ............ *G06F 3/0659* (2013.01); *G06F 3/064* (2013.01); *G06F 3/0605* (2013.01); *G06F 3/067* (2013.01); *G06F 3/0635* (2013.01); *G06F 3/0665* (2013.01)

(58) Field of Classification Search
CPC ...... G06F 3/0605; G06F 3/062; G06F 3/0631; G06F 3/0635; G06F 3/064; G06F 3/0659; G06F 3/0665; G06F 3/067; G06F 3/0673; G06F 21/78; G06F 2212/2146
See application file for complete search history.

(56) References Cited

U.S. PATENT DOCUMENTS

| | | | |
|---|---|---|---|
| 2008/0046630 A1* | 2/2008 | Lasser | G06F 13/1694 711/E12.002 |
| 2011/0078375 A1* | 3/2011 | Shepherd | G06F 3/067 711/E12.001 |
| 2012/0089579 A1* | 4/2012 | Ranade | G06F 16/183 707/693 |

(Continued)

FOREIGN PATENT DOCUMENTS

| | | |
|---|---|---|
| JP | 2007-280261 A | 10/2007 |
| KR | 10-2005-0009945 A | 1/2005 |

(Continued)

OTHER PUBLICATIONS

Sandisk. Sandisk Ultra +Cloud USB Flash Drive [online Apr. 13, 2016], [retrieved on Jun. 18, 2022], Retrieved from the Internet <URL: https://web.archive.org/web/20160413085328/https://www.sandisk.com/home/usb-flash/ultra-cloud-usbl> (Year: 2016).*

(Continued)

*Primary Examiner* — Larry T Mackall
(74) *Attorney, Agent, or Firm* — Cantor Colburn LLP

(57) ABSTRACT

A USB-based cloud disk according to an embodiment is connected with a computer, and, when a write command on a sector is received from the computer, the USB-based cloud disk transmits data regarding the sector and a data path regarding the sector data to a remote repository.

6 Claims, 10 Drawing Sheets

(56) References Cited

U.S. PATENT DOCUMENTS

2017/0192979 A1* 7/2017 Yang ................... G06F 16/116
2017/0329677 A1* 11/2017 Crofton ............... G06F 21/6227
2020/0034064 A1* 1/2020 LeCrone ............... G06F 3/0685

FOREIGN PATENT DOCUMENTS

| KR | 10-2009-0035484 A | 4/2009 |
| KR | 10-2012-0113106 A | 10/2012 |
| KR | 10-2015-0067643 A | 6/2015 |
| KR | 10-2015-0071898 A | 6/2015 |

OTHER PUBLICATIONS

Powerstick.com. CloudStick Cloud Storage in your Pocket [online Jun. 10, 2018], [retrieved on Jun. 18, 2022]. Retrieved from the Internet <URL: https://web.archive.org/web/20180610040228/https://powerstick.com/main/cloudstick/> (Year: 2018).*

Korean Office Action for KR Application No. 10-2018-0127235 dated Jun. 8, 2020.

International Search Report dated Jun. 15, 2020 for PCT/KR2019/013969.

* cited by examiner

| File Name | Sector No. |
|---|---|
| F/S | S0 |
| djk.mov | S2, S4, S7 |
| Jwk.jpg | S3, S10 |

<Table 1>

| Sector No. | Store type | Data path |
|---|---|---|
| S0 | Cloud Storage | https://drive.google.com/disk1/sector0 |
| S2 | Cloud Storage | https://drive.google.com/disk1/sector2 |
| S3 | Database | disk1, sector3 |
| S4 | Cloud storage | https://drive.google.com/disk1/sector4 |
| S7 | Cloud storage | https://drive.google.com/disk1/sector7 |
| S10 | Database | disk1, sector10 |

<Table 2>

FIG. 6

USB BASED CLOUD DISK AND DISK SEGMENT MANAGEMENT SYSTEM

TECHNICAL FIELD

The present disclosure relates to a USB-based cloud disk and a disk segment management system.

BACKGROUND ART

With the development of network technology, data stored in devices (for example, a desktop, a notebook, a portable device, or the like) used by users can be stored in a remote repository (cloud storage) on the Internet, and users can use data stored in the cloud storage anytime, anywhere by using their own accounts when necessary.

For example, Korean Patent Publication No. 10-2015-0067643 (published on Jun. 18, 2015) discloses a method for sharing files in a cloud storage service and an apparatus thereof.

DETAILED DESCRIPTION OF THE PRESENT DISCLOSURE

Technical Objects

According to an embodiment of the present disclosure, there is provided a USB-based cloud disk which can strengthen security of data stored in a remote repository, and can manage (store, delete, read, modify) data in the remote repository simply by connecting a USB storage device to a USB host.

According to another embodiment of the present disclosure, there is provided a cloud disk of a program type which is installed in a computer and can store and manage data in a remote repository.

According to another embodiment of the present disclosure, there are provided a data management system and a method which can strengthen security of data stored in a remote repository, and can manage (store, delete, read, modify) data in the remote repository simply by connecting a USB-based cloud disk to a USB host.

Technical Solving Means

According to one or more embodiments of the present disclosure, there is provided a USB-based cloud disk including: a computer processor; a storage unit operatively connected with the computer processor; a storage space configuration management unit configured to manage remote space configuration information; a block data connection unit; and a communication unit operatively connected with the computer processor, wherein the storage space configuration management unit and the block data connection unit are loaded into the storage unit and are operated under control of the computer processor, wherein the remote space configuration information includes a sector ID, a remote repository to store sector data, and a data path of sector data, and the sector ID, the remote repository, and the data path are associated with one another, wherein the data path indicates a place in the remote repository in which the sector data is stored, wherein the USB-based cloud disk is configured to receive a write command from a computer connected with the USB-based cloud disk, wherein the write command includes sector data (data 1) and an ID (S1) of a sector to store the sector data (data 1), wherein, when the USB-based cloud disk receives the write command, the storage space configuration management unit is configured to generate configuration information of the sector (S1), wherein the configuration information of the sector (S1) includes a remote repository to which the sector data (data 1) is transmitted, and a data path to store the sector data (data 1), wherein the block data connection unit is configured to transmit the sector data (data 1) and the data path of the sector data (data 1) to the remote repository included in the configuration information of the sector (S1) through the communication unit.

In the above-described embodiments, the storage space configuration management unit may identify whether there exists configuration information of the sector (S1) in the remote space configuration information, prior to generating the configuration information of the sector (S1), and, when there does not exist the configuration information of the sector (S1), may generate the configuration information of the sector (S1), and may perform an updating operation to add the generated configuration information of the sector (S1) to the remote space configuration information.

In the above-described embodiments, the sector data (data 1) and the data path of the sector data (data 1) that are transmitted to the remote repository by the block data connection unit may be acquired from the remote space configuration information updated by the block data connection unit.

In the above-described embodiments, the data path to store the sector data (data 1) may include a place to store the sector data (data 1) and a remote space block ID regarding the sector data (data 1), and the ID (S1) of the sector included in the write command may be a virtual space block ID, and the virtual space block ID and the remote space block ID may be mapped onto each other.

In the above-described embodiment, the USB-based cloud disk may receive a read command from the computer connected with the USB-based cloud disk, the read command may include an ID (S3) of a sector to be read, when the read command is received after the updating operation is completed, the storage space configuration management unit may identify whether there exists configuration information of the sector (S3) in the updated remote space configuration information, when there exists the configuration information of the sector (S3), the block data connection unit may transmit the data path of the sector (S3) to the remote repository included in the configuration information of the sector (S3) through the communication unit, and may receive data stored in the data path of the sector (S3) from the remote repository through the communication unit, and the USB-based cloud disk may transmit the received data to the computer which transmits the read command through the communication unit.

In the above-described embodiment, the USB-based cloud disk may receive a read command from the computer connected with the USB-based cloud disk, the read command may include an ID (S0) of a sector to be read, when the read command is received before the updating operation is completed, the storage space configuration management unit may identify whether there exists configuration information of the sector (S0) in the remote space configuration information before updating, when there does not exist the configuration information of the sector (S0), the storage space configuration management unit may generate the configuration information of the sector (S0) and may perform an updating operation to add the configuration information of the sector to the remote space configuration information before updating, and the configuration information of the sector (S0) may include a remote repository to which sector data (data 0) to be stored in the sector (S0) is transmitted, and a data path to store the sector data (data 0).

Advantageous Effects

According to one or more embodiments of the present disclosure, since data can be divided on a block basis and can be stored in a remote repository, it may be difficult to decipher data even if a hacker hacks into the remote repository storing the data.

According to one or more embodiments of the present disclosure, data can be stored in a remote repository and data stored in the remote repository can be read even if a drive of the remote repository is not installed in a USB host.

BRIEF DESCRIPTION OF THE DRAWINGS

FIG. 6 is a view to explain RSC information and F/S information;

[Explanation of Signs]

Figure 1:
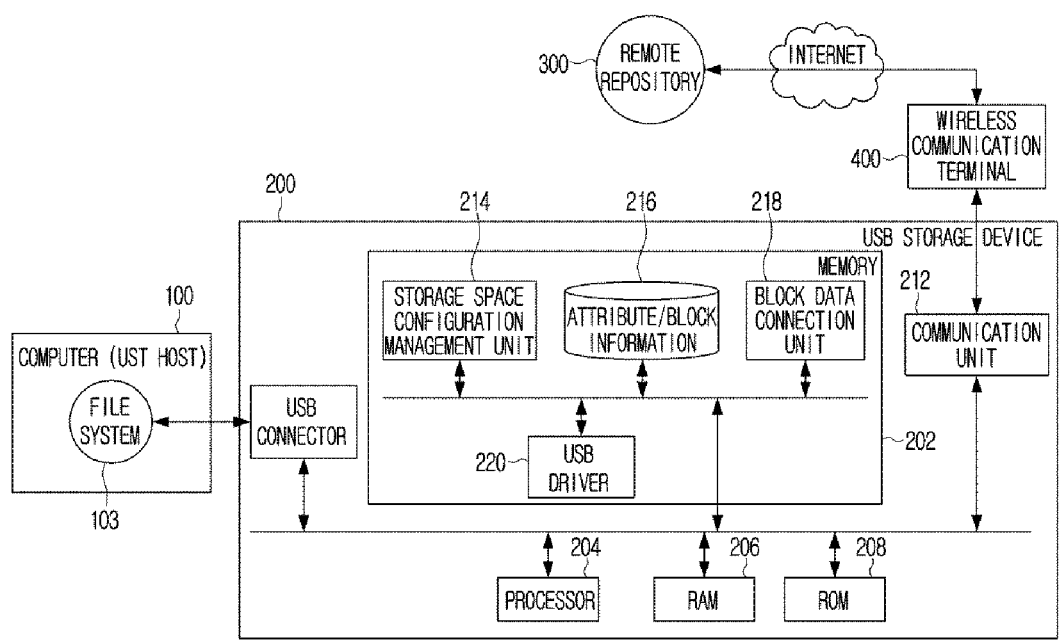
FIGS. 1 to 4 are views to explain a data management system using a USB-based cloud disk according to an embodiment of the present disclosure.
Figure 2:
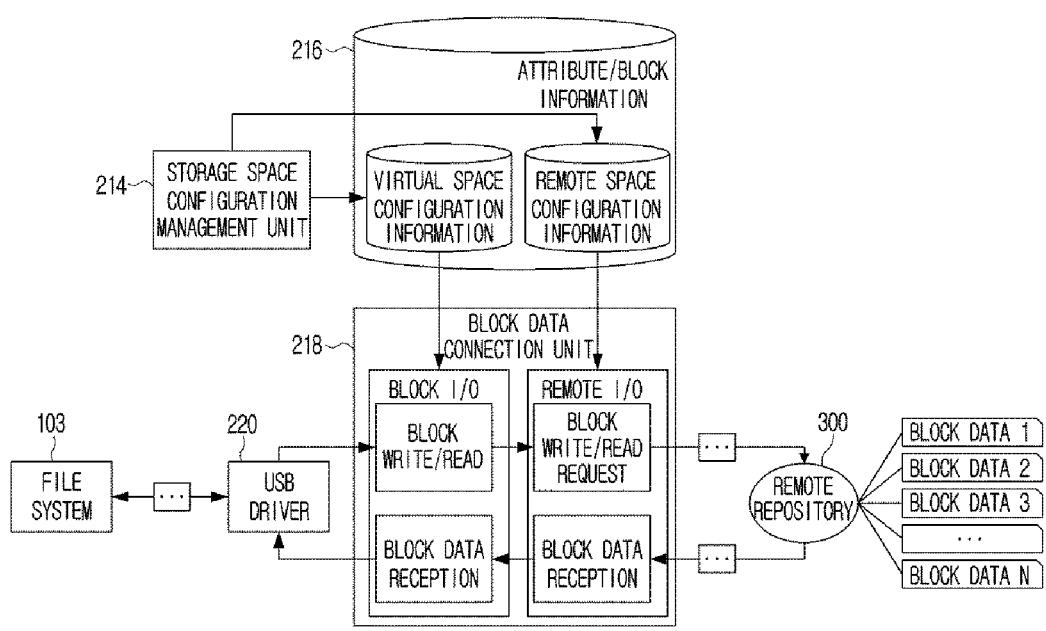
Figure 3:
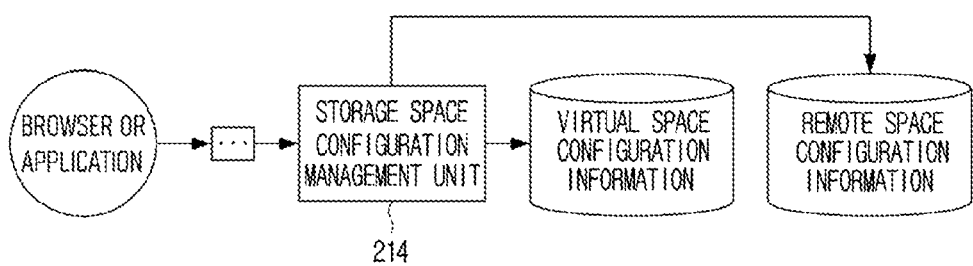
Figure 4:
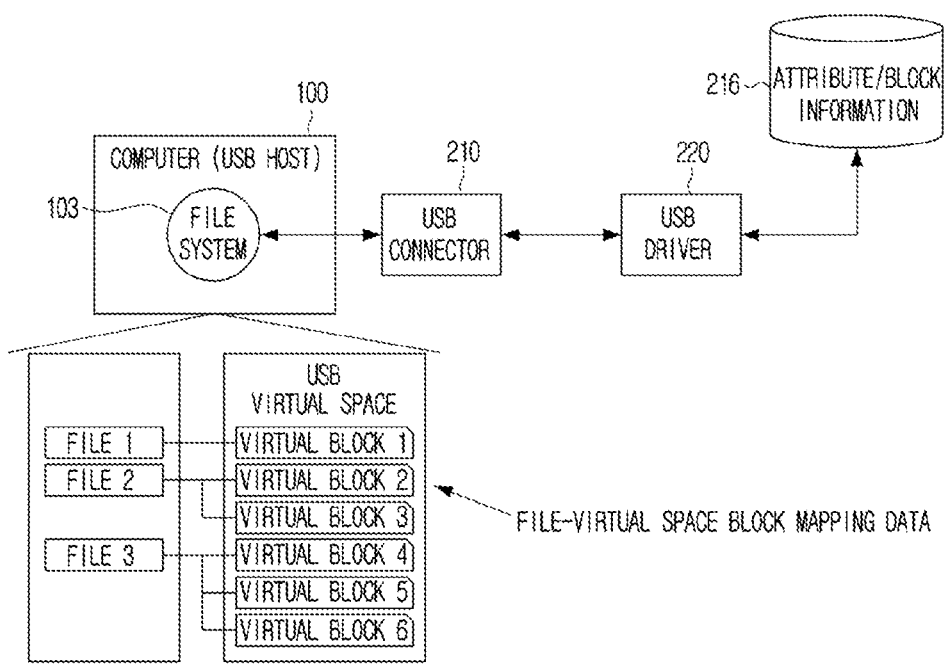

| | |
|---|---|
| USB host: 100 | Detector: 101 |
| File system: 103 | Disk layer: 105 |
| Communication unit 109 | USB storage device: 200 |
| Cloud disk of a program type: 2200 | |
| Remote repository: 300 | Wireless terminal device: 400 |

BEST MODE FOR EMBODYING THE INVENTION

Preferred embodiments will now be described more fully with reference to the accompanying drawings to clarify objects, other objects, features and advantages of the present disclosure. The exemplary embodiments may, however, be embodied in many different forms and should not be construed as limited to the exemplary embodiments set forth herein. Rather, the exemplary embodiments are provided so that this disclosure will be thorough and complete, and will fully convey the scope of the application to those of ordinary skill in the art.

In various embodiments of the preset disclosure, terms such as first, second are used to describe various elements, but the elements should not be limited by such terms. These terms are used for the purpose of distinguishing one element from another element only. The exemplary embodiments explained and exemplified herein include their complementary embodiments.

The terms used herein are for the purpose of describing particular exemplary embodiments only and are not intended to be limiting. As used herein, the singular forms "a", "an" and "the" are intended to include the plural forms as well, unless the context clearly indicates otherwise. It will be further understood that the terms "comprises" and/or "comprising," when used in this specification, do not preclude the presence or addition of one or more other components.

Definitions of Terms

In the detailed descriptions, the term 'software' refers to technology for moving hardware in a computer, the term 'hardware' refers to a tangible device or apparatus (a central processing unit (CPU), a memory, an input device, an output device, a peripheral device, etc.) constituting a computer, the term 'step' refers to a series of processes or operations connected in time series to achieve a predetermined object, the term 'program' refers to a set of commands suitable for processing by a computer, and the term 'recording medium' refers to a computer-readable recording medium having a program installed therein, and having a program recorded thereon to be executed or distributed.

In the detailed descriptions, the term 'execution' refers to a program being loaded into a storage unit and operating under control of a computer processor although the term is not specifically defined.

In the detailed descriptions, the term 'file system' refers to a 'system for storing or organizing files or materials in a computer to be easily found or accessed', or a 'program for storing or organizing files or materials in a computer to be easily found and accessed'. For example, the 'file system' is configured to include a plurality of layers like a storage device, an input/output control, a basic file system, a file organization module, a virtual file system, and herein, the virtual file system may be included in the file system (for example, an operating system (OS) like Linux) or may not be included in the file system (for example, an OS like Window) according to an OS of the computer. Hereinafter, the 'file system' used in the present disclosure refers to any one of a file system that does not include a virtual file system, a file system including a virtual file system, and a virtual file system, for the sake of explanation.

In the detailed descriptions, the term 'universal serial bus (USB)' refers to series BUS standards for connecting a peripheral device to an information device such as a computer, etc., or refers to a 'USB storage device'.

In the detailed descriptions, the term 'USB storage device' refers to a portable storage device that has a function of transmitting and receiving data according to USB standards. The 'USB storage device' has a function of freely storing or deleting data and reserving data as it is even when power is turned off, unlike a read only memory (ROM) in which stored data cannot be deleted or modified, or a random access memory (RAM) in which stored data can be deleted or modified, but can be erased when power is shut off. The term 'USB storage device' may be, for example, a 'USB flash drive' or a 'USB memory'.

In the detailed descriptions, the term 'storage unit' refers to a computer-readable element that can temporarily or permanently store data, and the 'storage unit' may indicate at least one of a volatile memory, a nonvolatile memory, a hard disk, and a solid state disk.

In the detailed descriptions, the term 'data management system' refers to a system for managing data, and the term 'management' has a meaning including 'receiving', 'transmitting', 'storing', 'modifying', or 'deleting' data, and the term 'unit' refers to a program for performing a certain function.

In the detailed descriptions, the term 'disk segment management system' is used to indicate both a storage space management unit and a block data connection unit.

Hereinafter, embodiments of the present disclosure will be described in detail with reference to the drawings.

Figure 5:
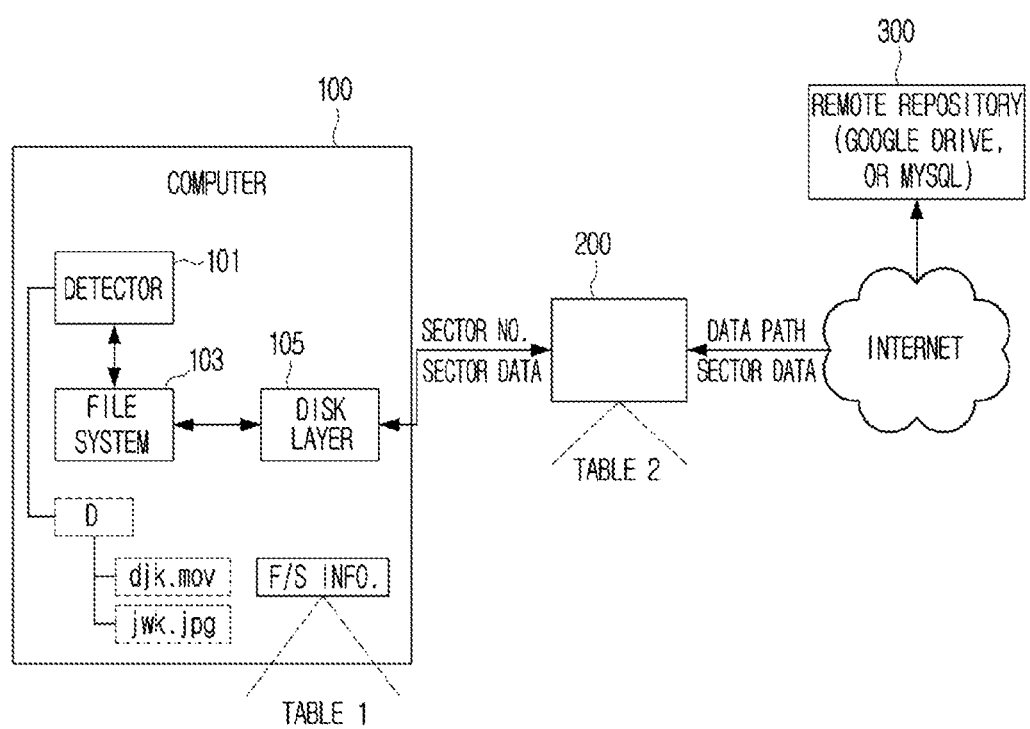
FIG. 5 is a view to explain a USB-based virtual cloud disk according to an embodiment of the present disclosure.

FIG. 5 is a view to explain a USB-based virtual cloud disk according to an embodiment of the present disclosure.

Referring to FIG. 5, the USB-based virtual cloud disk (VCD) 200 according to an embodiment of the present disclosure is operatively connected to a USB port (not shown) provided in a computer 100. In the detailed descriptions, the USB-based virtual cloud disk according to an embodiment of the present disclosure is often referred to as a 'VCD' or a 'USB storage device'.

The computer 100 may include a detector 101, a file system 103, a disk layer 105, a storage unit (not shown), an operating system (not shown), and hardware and programs (not shown) for operating these elements.

The operating system (not shown) may include the file system 103 and the disk layer 105, and the disk layer 105 may recognize a storage device like hard disk.

The disk layer 105 may receive a read instruction and a write instruction regarding a sector, which is a constituting unit of a hard disk, from the file system 103, and may transmit the instructions to the hard disk. The disk layer 105 may transmit sector data received from the hard disk to the file system 103. In embodiments described with reference to FIGS. 5 to 9, and embodiments described with reference to FIGS. 1 to 4, data and instructions are transmitted and received between the file system 103 and the VCD 200 via the disk layer 105 although the disk layer 105 is not specifically defined.

The VCD 200 may include a communication unit (not shown) to communicate with a remote repository 300 through the Internet, a computer processor (not shown), a storage unit (for example, including a volatile memory and a nonvolatile memory) (not shown) operatively connected with the computer processor (not shown), a disk segment management system, hardware for performing various operations, and a program (not shown). These elements are operatively connected with one another.

The disk segment management system includes a storage space configuration management unit (not shown) (hereinafter, an 'SCM') for managing remote space configuration information, and a block data connection unit (not shown) (hereinafter, a 'BDC').

The storage unit (not shown) may temporarily or permanently store programs and data. For example, the SCM (not shown) and the BLDC (not shown) may be loaded into the storage unit (not shown) and may operate. In addition, basic data and RSC information may also be temporarily or permanently stored in the storage unit (not shown) and may be used by the SCM (not shown) and the BDC (not shown).

When the VCD 200 is connected to the computer 100, the SCM (not shown) is loaded into the storage unit (not shown) under control of the computer processor (not shown), and performs an operation of managing basic data (meaning virtual space configuration information) and remote space configuration information. In the detailed descriptions, the remote space configuration information is referred to as 'RSC information'.

Regarding specific examples of the SCM (not shown), the BDC (not shown), the virtual space configuration information, and the remote space configuration information, reference is made to embodiments described with reference to FIGS. 1 to 4.

When the VCD 200 is connected to the computer 100, the BDC (not shown) may be loaded into the storage unit (not shown) under control the computer processor (not shown), and may perform an operation of receiving a read instruction and a write instruction from the computer 100.

The BDC (not shown) may perform an operation of requesting sector data from the remote repository 300 or requesting to store sector data.

When the VCD 200 is connected to the USB port provided in the computer 100, the computer 100 recognizes the VCD 200 as a storage device like a hard disk or a USB memory.

In the following descriptions, expression 'the VCD 200 being connected to the computer 100' means that the VCD 200 is connected to the USB port.

When a user wishes to store a file stored in the computer 100 (or a file stored in a certain repository) (hereinafter, referred to as a 'target file') in the VCD 200, the user connects the VCD 200 to the computer 100 and inputs a command to store the target file in the VCD 200.

The computer 100, which receives the storing command, may divide the target file into one or more data and allocates the data to sectors, respectively, and transmit the data allocated to the sectors (hereinafter, 'sector data') to the VCD 200 in sequence.

The file system 103 may see how many sector data the target file is divided into, by referring to basic data provided by the VCD 200. The file system 103 may see which sectors will be allocated, by referring to F/S information on the VCD 200.

The VCD 200 may transmit the sector data received from the computer 100 to the remote repository 300 in sequence. The real place where the sector data is stored is the remote repository 300, but the computer 100 understands that the VCD 200 stores the sector data and deals with that.

The VCD 200 stores and manages basic data and RSC information. For example, the SCM (not shown) manages basic data and RSC information.

The basic data may include a type of the remote repository (hereinafter, may be referred to as a 'store server'), a storage capacity of the VCD 200, and a format type. The VCD 200 generates configuration information regarding sectors by using the basic data, and may add the configuration information to the RSC information.

The format type may be, for example, a file allocation table (FAT), a file allocation table 32 (FAT 32), a new technology file system (NTFS), or an extended FAT (exFAT), but the present disclosure is not limited thereto.

The RSC information includes a sector ID, a remote repository to store sector data, and a data path. Herein, the data path indicates a path through which sector data is stored in the remote repository, and the sector ID, the remote repository to store sector data, and the data path are associated with one another.

The RSC information and the basic data may be stored and managed in the storage unit (not shown) provided in the VCD 200, or another remote repository 300 (not shown), not in the remote repository 300.

FIG. 6 is a view to explain RSC information and F/S information.

Referring to FIG. 6, table 2 is illustrated as an example of RSC information, and table 1 is illustrated as an example of F/S information.

Referring to FIG. 6, table 2 includes configuration information regarding sectors. Specifically, the configuration information of the sector includes a sector ID, a store type, and a data path, and the sector ID, the store type and the data path are associated with one another.

Referring to table 2, the data path of a sector having a sector ID of S0 is 'https://drive.google.com/disk1/sector0'. Herein, 'sector0' may be a remote space block ID of data of S0. In addition, the data path of a sector having a sector ID of S3 is 'disk1, sector3', and herein, 'sector3' may be a remote space block ID.

The sector ID included in the configuration information of the sector is given by the file system 103, and may correspond to a 'virtual space block ID' described in embodiments of FIGS. 1 to 4.

The data path includes a remote space block ID, and for example, 'sector0', 'sector3' may correspond to a remote space block ID. Regarding the virtual space block ID and the remote space block ID, reference is made to embodiments of FIGS. 1 to 4.

The store type defines a remote repository that can store sector data. For example, the store type may be a cloud storage, a database, or a network attached storage (NAS). The cloud storage may be a commercial product, for example, Google Drive™, OneDrvie™, Dropbox™, MYBOX™, Baidu Cloud™, and a commercial product of the database may be, for example, MySQL™ or Oracle™.

The store type defines what kind of remote repository 300 stores sector data, such as a cloud storage, a database, or an NAS.

A format of the data path varies according to a store type. Accordingly, when generating the configuration information of the sector, the SCM (not shown) determines a store type, first, and generates a data path of a format supported by the determined store type.

The data path may include information indicating a place where sector data is stored, and a remote space block ID. For example, when data of S4 is stored in the remote repository 300, the VCD 200 transmits the data path of S4 and the data of S4 to a cloud storage, which is the remote repository 300.

The cloud storage which receives the data path of S4 and the data of S4 stores the data of S4 in the data path of S4.

In another example, when the VCD 200 requests data of S10 stored in a cloud storage which is the remote repository 300, the VCD 200 requests data of S10 while transmitting a data path of S10 to the cloud storage. The cloud storage finds the data of S10 by using a keyword "disk1, sector10" included in the data path of S10, and transmits the data of S10 to the VCD 200.

Referring to FIG. 6, F/S information includes a file and a sector ID, and one or more sectors IDs correspond to (that is, are mapped onto) one file. The sector ID included in the F/S information is a virtual space block ID.

Hereinafter, operations of formatting, writing sector data, and reading sector data will be described in sequence with reference to FIGS. 7 to 9. In the detailed descriptions, types of RSC information, F/S information, or instructions are merely examples for convenience of the present disclosure, and the present disclosure is not limited to the expressions.

Formatting

Figure 7:
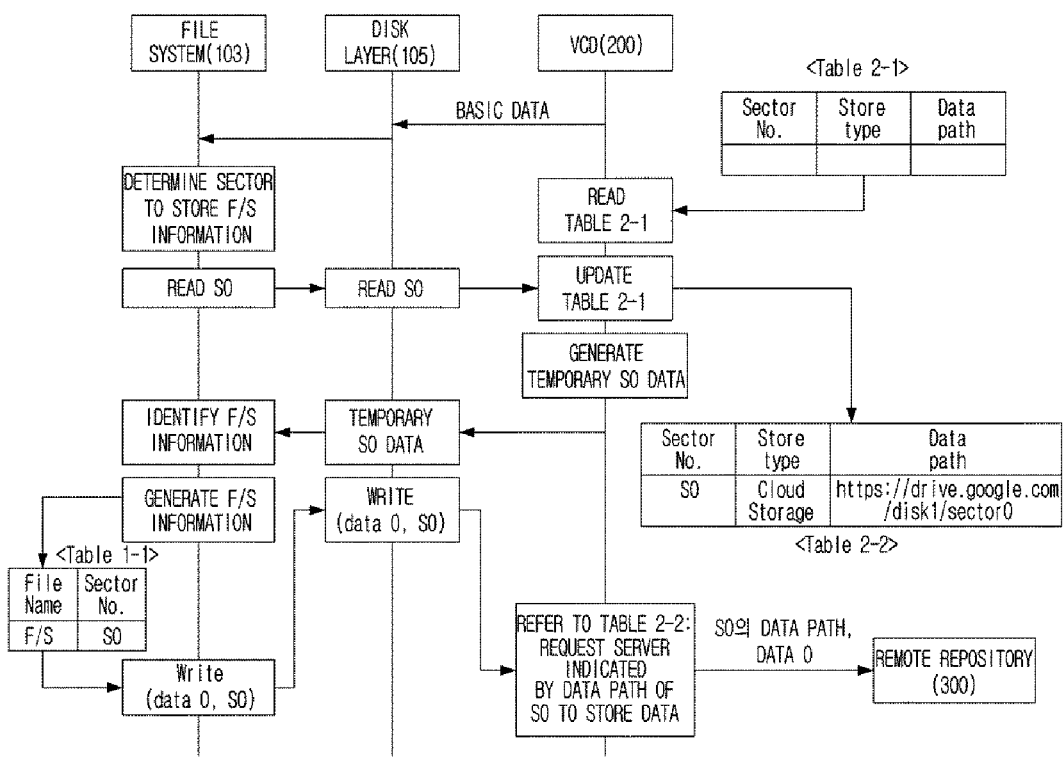
FIG. 7 is a view to explain an operation of formatting a virtual cloud disk (VCD) 200 according to an embodiment of the present disclosure.

FIG. 7 is a view to explain an operation of formatting the VCD 200 according to an embodiment of the present disclosure.

Referring to FIG. 7, when the VCD 200 is connected to the computer 100, the VCD 200 provides basic data to the computer 100. The VCD 200 reads RSC information (for example, table 2-1) and stores the RSC information in the storage unit (not shown) (for example, a nonvolatile memory such as an RAM) provided in the VCD 200.

The basic data and the RSC information may be stored in the storage unit (not shown) provided in the VCD 200 as described above, or may be stored in a certain remote repository 300 (not shown), not in the remote repository 300, and may be managed by the VCD 200.

The basic data is provided to the file system 103. The disk layer 105 recognizes that the VCD 200 is connected to the USB port, and performs operations of transmitting, reading, and writing sector data between the VCD 200 and the file system 103.

The file system 103 may find a sector to store F/S information by referring to a format type included in the basic data. This is because a sector to store the F/S information is already determined according to a format type. In the present embodiment, it is assumed that F/S information is stored in sector 0 (hereinafter, 'S0').

The file system 103 transmits a read instruction READ (S0) to read sector data stored in S0 to the VCD 200 in order to find F/S information of the VCD 200. Herein, 'S0' is a sector ID.

When the VCD 200 receives the read instruction READ (S0), the SCM (not shown) refers to RSC information (table 2-1), and identifies whether there is configuration information S0 in the RSC information (table 2-1).

In this case, since the VCD 200 is not still formatted, configuration information of S0 does not exist in the RSC information (table 2-1). When the configuration information of S0 does not exist, the SCM (not shown) generates configuration information of S0 and performs an updating operation to add the generated configuration information of S0 to the table 2-1. In FIG. 7, the updated table 2-2 is illustrated.

The SCM (not shown) updates the table 2-1 to table 2-2, and temporarily generates data of S0. The temporarily generated data of S0 (hereinafter, 'temporary S0 data') may be, for example, data which is formed only of '0' or '1'.

The VCD 200 transmits the temporary S0 data to the file system 103. The file system 103 identifies whether there is F/S information in the temporary S0 data. In this case, since the temporary S0 data does not have F/S information, the file system 103 generates F/S information. The file system 103 transmit a write instruction Write (data 0, S0) to write the generated F/S information on S0 to the VCD 200. Herein, data 0 is data that constitutes F/S information.

Since table 2-2 contains the configuration information of S0, the VCD 200 transmits data 0 and a data path of S0 to the remote repository 300 by using the configuration information of S0. For example, since table 2-2 shows that the data path of S0 is 'https://drive.google.com/disk1/sector0', the BDC (not shown) requests Google Drive to store data 0 at 'https://drive.google.com/disk1/sector0' while transmitting data 0. In response to this request, the Google Drive stores data 0 in a place indicated by https://drive.google.com/disk1 with the ID of 'sector0'.

Some operations in the formatting operations described above with reference to FIG. 7 are repeated in a reading operation and a writing operation. The repeated operations will be referred to as basic operations in the detailed descriptions. The basic operations are performed every time the VCD 200 is connected to the USB port of the computer 100. Referring to FIG. 7, the basic operations include a series of operations from the operation of the VCD 200 transmitting basic data to the file system 103 to the operation of the file system 103 receiving data of S0 from the VCD 200 and identifying whether F/S information is included.

Writing Data

Figure 8:
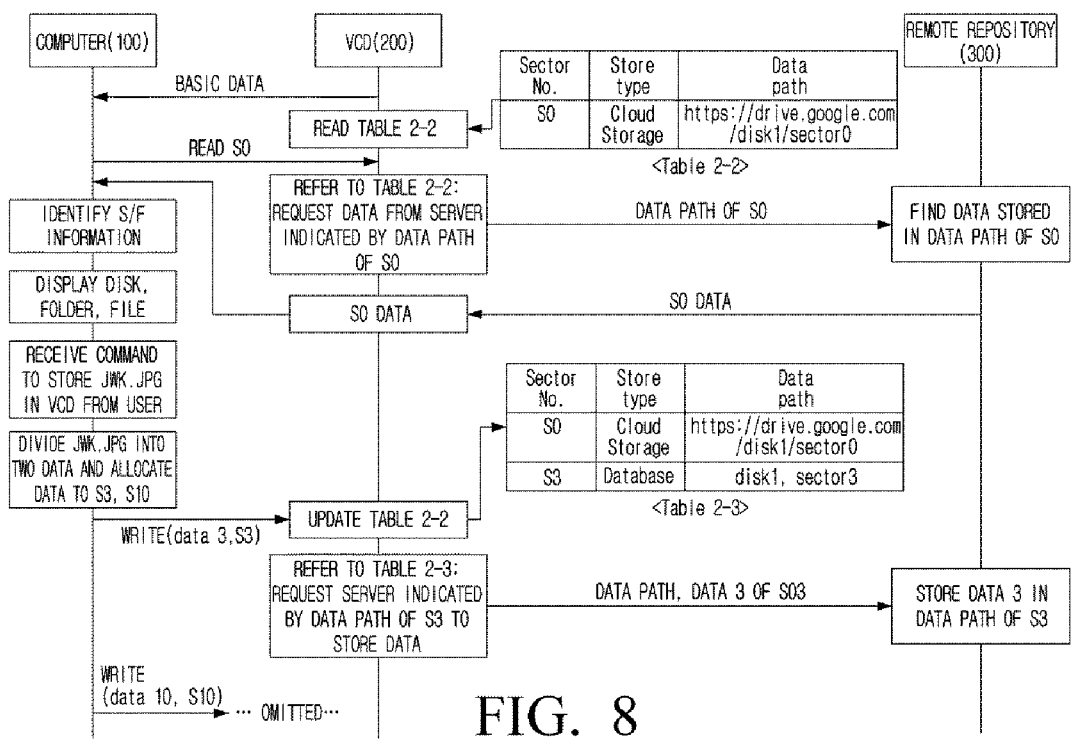
FIG. 8 is a view to explain an operation of writing data on the VCD 200 according to an embodiment of the present disclosure.

FIG. 8 is a view to explain an operation of writing data on the VCD 200 according to an embodiment of the present disclosure.

FIG. 8 shows a state in which the operation of formatting the VCD 200, described above with reference to FIG. 7, is completed. Accordingly, an operation of writing a file of jwk.jpg on the VCD 200 will be described on the assumption that RSC information is table 2-2 and F/S information is table 1-1 in FIG. 7.

When the VCD 200 is connected to the computer 100, the above-described basic operations are performed between the VCD 200 and the computer 100. For example, the SCM (not shown) provides basic data to the computer 100, and reads out table 2-2 and stores the same in the storage unit (not shown) provided in the VCD 200. The file system 103 finds a sector allocated to F/S information by referring to the basic data.

In the present embodiment, since sector S0 is allocated to the F/S information, the file system 103 transmits a read instruction READ (S0) to the VCD 200. When the read instruction REM) (S0) is received, the SCM (not shown) refers to table 2-2 stored in the storage unit (not shown). In the present example, since configuration information of S0 exists in the table 2-2, the VCD 200 requests data from the remote repository 300 while transmitting a data path of S0 (for example, https://drive.google.com/disk1/sector0) to the remote repository 300.

The remote repository 300 finds data stored in the data path of S0, and transmits the data to the VCD 200, and the VCD 200 provides the data to the computer 100. The computer 100 may identify F/O information in the data of S0. The F/O information includes node information (folder and files). The detector 101 receives such node information from the file system 103, and displays information on a virtual disk (for example, D) corresponding to the VCD 200, and folders and files positioned under the virtual disk in order for the user to view.

When the computer 100 receives a command to copy a target file (for example, jwk.jpg) into the VCD 200 from a user, the computer 100 divides data of jwk.jpg into one or more data, and allocates the data to sectors. For example, if the capacity of jwk.jpg is 6 KB and the sector capacity is 4 KB, two sectors are required to be allocated to jwk.jpg. That is, the file system 103 divides the data of jwk.jpg into two data, and allocates the two data to sector S3 (hereinafter, 'S3') and sector S10 (hereinafter, 'S10'), respectively. For convenience of explanation, data allocated to S3 is referred to as data 3, and data allocated to S10 is referred to as data 10.

The file system 103 transmits an instruction WRITE (data 3, S3) to the VCD 200. When the VCD 200 receives the instruction WRITE (data 3, S3), the SCM (not shown) identifies whether there is configuration information of S3 by referring to table 2-2. Since the configuration information of S3 is not included in table 2-2, the SCM (not shown) generates configuration information of S3 and adds the configuration information of S3 to table 2-2. FIG. 8 illustrates table 2-3 to which the configuration information of S3 is added.

In table 2-3, the data path of S3 is indicated by 'disk1, sector3'. Herein, sector 3 indicates a remote space block II) regarding the data of S3.

In the present embodiment, when the VCD 200 generates the data path of data 3, the VCD 200 may know that S3 which is a sector ID given by the file system 103 (that is, a 'virtual space block ID') is converted into 'sector 3' which is a remote space block ID.

Alternatively, the virtual space block ID and the remote space block ID may be equally used, and in this case, when generating the data path, the VCD 200 uses the sector ID received from the file system 103 as it is as a remote space block ID. The same is applied to a PCD 2200, which will be described below.

Table 2-3 is an updated version of table 2-2, and the SCM (not shown) always refers to the most recently updated remote configuration information.

The same operation as described above is performed for data 10 allocated to sector S10. That is, when the VCD 200 receives an instruction WRITE (data 10, S10), the SCM (not shown) identifies whether there is configuration information of S10 in table 2-3, first. When there is no configuration information of S10, the SCM (not shown) generates configuration information of S10 and adds the configuration information to table 2-3. Table 2-4 is an updated version of table 2-3, and additionally includes the configuration information of S10. The VCD 200 stores data 10 in the remote repository 300 by using the configuration information of S10.

Referring to table 2-3, the remote repository 300 in which the data of S3 is stored is a database. The data path of S3 is 'disk1, sector 3'. The remote repository 300 of the database type may find the data of S3 stored in a specific column of a specific record of a specific table, by using the keyword 'disk 1, sector 3'.

Reading Data

Figure 9:
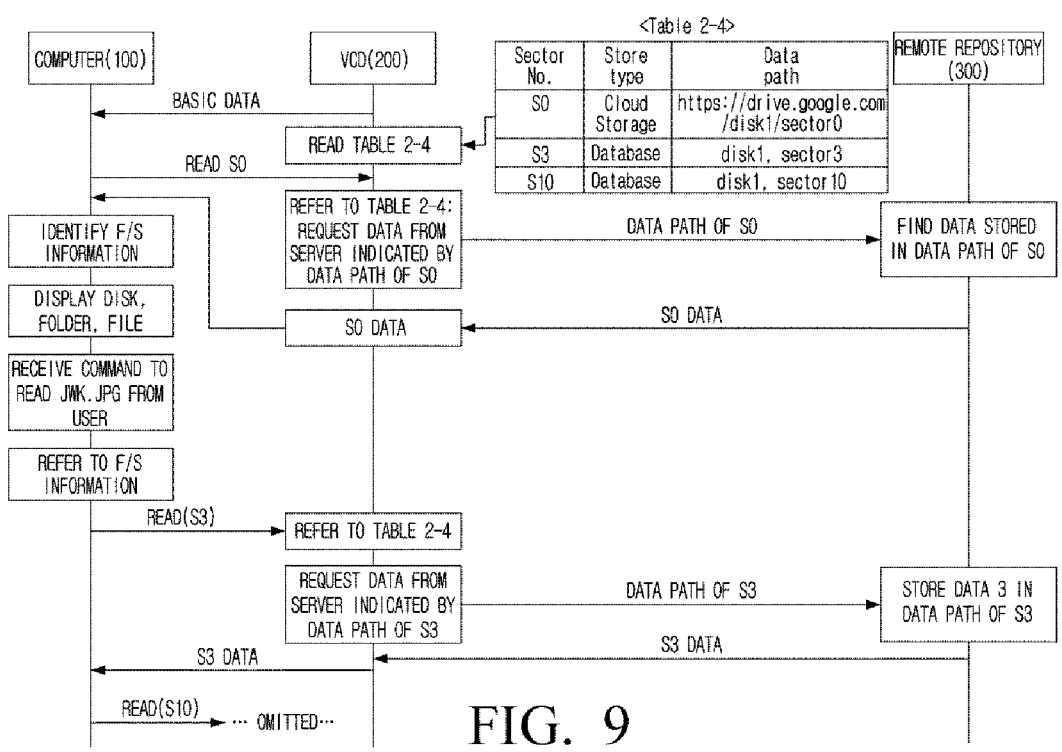
FIG. 9 is a view to explain an operation of reading data from the VCD 200 according to an embodiment of the present disclosure.

FIG. 9 is a view to explain an operation of reading data from the VCD 200 according to an embodiment of the present disclosure.

The VCD 200 in FIG. 9 is in the state described above with reference to FIG. 8. Accordingly, RSC information is table 2-4, and in F/S information, a file corresponds to S0, S3, S10.

Hereinafter, an operation of reading jwk.jpg will be described.

When the VCD 200 is connected to the computer 100, the above-described basic operations are performed between the VCD 200 and the computer 100. That is, the SCM (not shown) provides basic data to the computer 100, and reads out table 2-4 and stores table 2-4 in the storage unit (not shown) provided in the VCD 200. The file system 103 of the computer 100 finds a sector allocated to F/S information by referring to the basic data.

In the present embodiment, since sector S0 is allocated to the F/S information, the computer 100 transmits a read instruction READ (S0) to the VCD 200. When the VCD 200 receives the read instruction READ (S0), the SCM (not shown) refers to table 2-4 stored in the storage unit (not shown).

The BDC (not shown) requests data from the remote repository while transmitting the data path of S0 (for example, https://drive.google.com/disk1/sector0) to the remote repository 300 by using configuration information of S0 in table 2-4.

The remote repository 300 finds data (that is, data of S0) stored in the data path of S0, and transmits the data to the VCD 200, and the VCD 200 provides the data of S0 to the computer 100.

The computer 100 may identify F/O information in the data of S0. The F/O information includes node information (folder and files), and the detector 101 receives the node information from the file system 103, and displays information on a virtual disk (for example, D) corresponding to the VCD 200, and a folder and files positioned under the virtual disk in order for a user to view.

When the user selects reading of jwk.jpg, the computer 100 may find sectors allocated to jwk.jpg by referring to the F/S information.

The computer 100 transmits read instructions regarding S3 and S10 to the VCD 200 in sequence. For example, when the computer 100 transmits a read instruction READ (S3) to the VCD 200, the SCM (not shown) identifies whether there is configuration information of S3 by referring to table 2-4.

When there is the configuration information of S3, the BDC (not shown) requests data of S3 while transmitting a data path included in the configuration information of S3 to the remote repository 300. In the present example, the remote repository 300 which is a database receives the request. The remote repository 300 finds data stored in a place indicated by the data path of S3, and transmits the data to the VCD 200, and the VCD 200 provides the data to the computer 100. Data of S10 may be read in the same way as the data of S3.

Various embodiments of the USB-based cloud disk according to the present disclosure have been described with reference to FIGS. 5 to 9. The present disclosure may be implemented by a cloud disk configured as a program of the computer 100 (hereinafter, referred to as a 'cloud disk of a program type'). That is, the above-described USB-based cloud disk may be configured as a computer program, not as an apparatus.

Figure 10:
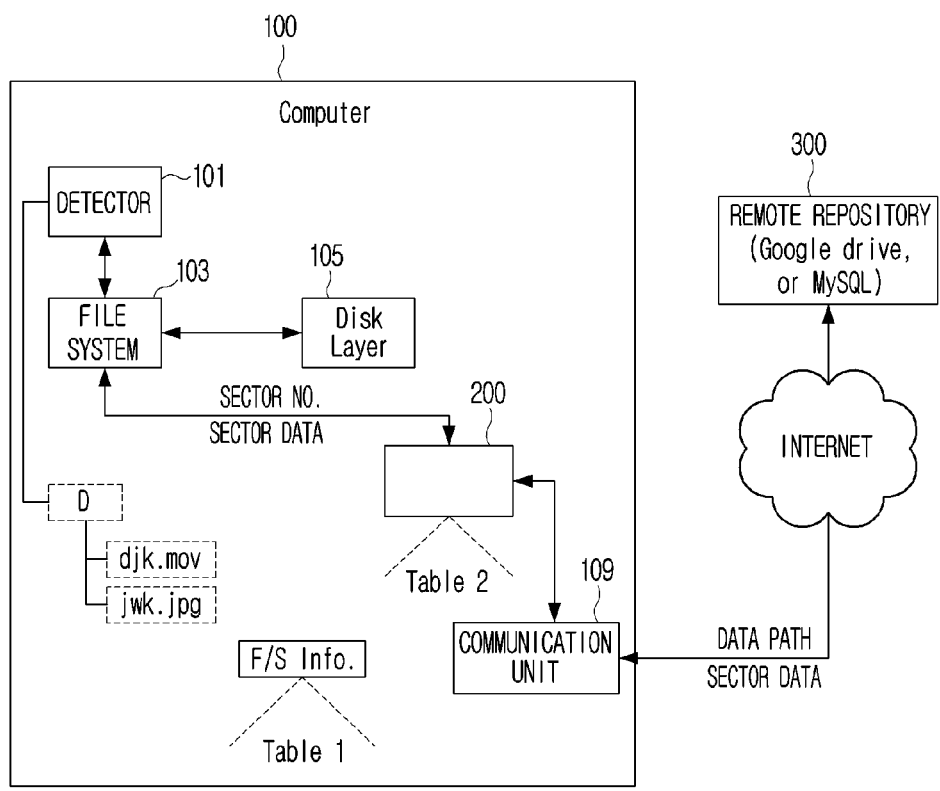
FIG. 10 is a view to explain a cloud disk of a program type.

FIG. 10 is a view to explain a cloud disk of a program type.

Referring to FIG. 10, the cloud disk 2200 of the program type according to an embodiment of the present disclosure may be installed and executed in the computer 100. The cloud disk 2200 of the program type is operatively connected with the file system 103 and the remote repository 300. The same reference numerals are used for the elements which perform the same or similar operations in FIGS. 5 and 10.

Referring to FIG. 10, the computer 100 includes a communication unit 109, and the cloud disk in the program type (hereinafter, 'PCD') 2200 according to an embodiment of the present disclosure requests the remote repository 300 to store sector data or requests sector data from the remote repository 300 through the communication unit 109.

The PCD 2200 includes a storage space configuration management unit (not shown) and a block data connection unit (not shown). Regarding operations of the storage space configuration management unit (not shown) and the block data connection unit (not shown), reference is made to the embodiments described with reference to FIGS. 5 to 9, and embodiments described with reference to FIGS. 1 to 4.

Hereinafter, operations of the PCB 2200 will be described in detail, and differences from the VCD 200 will be highlighted. The PCD 2200 is operatively connected with the file system 103, not with the disk layer 105. When the PCD 2200 is executed by a user in the computer 100, the file system 103 recognizes that a physical USB storage device is connected to the USB port provided in the computer 100. When the PCD 2200 is executed by the user, the PCD 2200 generates a virtual signal (hereinafter, a 'virtual connection signal') indicating connection to the USB port provided in the computer 100, and transmits the virtual signal to the file system 103. The file system 103, which receives the virtual connection signal, recognizes the PCD 2200 as being connected to the USB port provided in the computer.

The PCD 2200 transmits basic data to the file system 103.

Referring to FIG. 10, when the user of the computer 100 wishes to store a target file in the PCD 2200, the user inputs a command to store the target file in the PCD 2200. The computer 100 which receives the storing command divides the target file into one or more data and allocates the data to sectors, and transmits the data allocated to the sectors (hereinafter, 'sector data') to the PCD 2200.

The PCD 2200 transmits the sector data received from the computer 100 to the remote repository 300 in sequence. A place where the target file is really stored is the remote repository 300, but the computer 100 understands that the target file is stored in the PCD 2200 and deals with that.

The PCD 2220 stores and manages basic data and RSC information in the same ways as the VCD 200 described above with reference to FIGS. 5 to 9. For example, the PCD 2200 may generate configuration information of a sector by using the basic data.

The RSC information and the basic data may be stored and managed in a storage unit (not shown) provided in the computer 100, or another remote repository 300 (not shown), not in the remote repository 300.

Operations of the PCD 2200 formatting, writing, and reading are the same as or similar to the operations of the VCD 200.

The operation of formatting in the PCD 2200 according to an embodiment of the present disclosure will be described with reference to FIG. 10, and reference is made to some explanation of FIGS. 5 to 9.

When the PCD 2200 is executed in the computer 100, the PCD 2200 provides a virtual connection signal to the file system 103, and provides basic data to the file system 103. Thereafter, the PCD 2200 reads out RSC information (for example, table 2-1 of FIG. 7) and temporarily stores the RSC information in the storage unit (not shown) provided in the computer 100.

The file system 103 may find a sector to store F/S information by referring to a format type included in the basic data. The file system 103 transmits a read instruction READ (S0) to the PCD 2200 to find the F/S information.

When the PCD 2200 receives the read command READ (S0), the PCD 2200 refers to the RSC information (table 2-1) and identifies whether there is configuration information of S0 in the RSC information (table 2-1). Since there does not exist the configuration information of S0 in the RSC information (table 2-1), the PCD 2200 generates configuration information of S0 and performs an updating operation to add the configuration information to table 2-1. Table 2-2 of FIG. 7 is an updated version of table 2-1.

The PCD 2200 updates table 2-1 to table 2-2 and generates temporary S0 data.

The PCD 2200 provides the temporary S0 data to the file system 103. The file system 103 generates F/S information since there is no F/S information in the temporary S0 data. The file system 103 makes the generated F/S information as data to be stored in S0 (hereinafter, 'data 0'), and transmits a write instruction Write (data 0, S0) to the PCD 2200.

When the write instruction Write (data 0, S0) is received, the PCD 2200 refers to table 2-2 which is remote configuration information. Since there exists configuration information of S0 in table 2-2, the PCD 2200 transmits data 0 which is data of S0 to the remote repository 300 by using the configuration information. The remote repository 300 stores data 0 in response to the request.

The operation of writing in the PCD 2200 according to an embodiment of the present disclosure will be described with reference to FIG. 10, and reference is made to some explanation of FIGS. 5 to 9.

On the assumption that a formatting operation of the PCD 2200 is completed as described above, and accordingly, RSC information is table 2-2 and F/S information is table 1-1 of FIG. 7, an operation of writing the file of jwk.jpg in the PCD 2200 will be described.

When the PCD 2200 is executed in the computer 100, the PCD 2200 provides a virtual connection signal to the file system 103, and provides basic data to the file system 103. Thereafter, the PCD 2200 reads out RSC information (for example, table 2-2 of FIG. 7) and temporarily store the RSC information in the storage unit (not shown) provided in the computer 100.

The file system 103 may find a sector in which F/S information is stored, by referring to a format type included in the basic data. The file system 103 transmits a read instruction READ (S0) to the PCD 2200 to find F/S information. When the PCD 2200 receives the read instruction READ (S0), the PCD 2200 refers to table 2-2 stored in the storage unit (not shown). The PCD 2200 requests data from the remote repository 300 while transmitting the data path of S0 by using configuration information of S0 existing in table 2-2.

The remote repository 300 finds data stored in the data path of S0 and transmits the data to the PCD 2200, and the PCD 2200 provides the data to the file system 103.

If a user wishes to copy the target file of jwk.jpg into the PCD 2200, the file system 103 divides the file of jwk.jpg int two data, and allocates the data to S3 and S10, respectively.

The file system 103 transmits an instruction WRITE (data 3, S3) to the PCD 2200. The PCD 2200 identifies whether there is configuration information of S3 by referring to table 2-2. Since the configuration information of S3 is not included in table 2-2, the PCD 2200 generates configuration information of S3 and adds the configuration information to table 2-2. FIG. 8 illustrates table 2-3 to which the configuration information of S3 is added by way of an example.

The above-described operation is performed with respect to data 10 allocated to S10. That is, the PCD 2200 which receives WRITE (data 10, S10) identifies whether there is configuration information of S10, first, by referring to table 2-3. When there is no configuration information of S10, the PCD 2200 generates configuration information of S10 and adds the configuration information to table 2-3. The table 2-4 is an updated version of table 2-3 and additionally includes the configuration information of S10. The PCD 2200 stores data 10 in the remote repository 300 by using the configuration information of S10.

The reading operation in the PCD 2200 according to an embodiment of the present disclosure will be described with reference to FIG. 10, and reference is made to some explanation of FIGS. 5 to 9.

In FIG. 10, it is assumed that formatting of the PCD 2200 is completed and the file of jwk.jpg, is stored in the PCD 2200 as described above. It is assumed that RSC information is table 2-4 (see FIG. 9), and F/S information includes file information allocated to S0, S3, S10.

When the PCD 2200 is executed in the computer 100, the PCD 2200 provides a virtual connection signal to the file system 103, and provides basic data to the file system 103. Thereafter, the PCD 2200 reads RSC information (table 2-4) and temporarily store the RSC information in the storage unit (not shown) (for example, a RAM) provided in the computer 100.

The PCD 2200 provides the basic data to the file system 103. The file system 103 may find a sector to store F/S information by referring to a format type included in the basic data. The file system 103 transmits a read instruction READ (S0) to read data stored in S0 to the PCD 2200 in order to find F/S information.

When the PCD 2200 receives the read instruction READ (S0), the PCD 2200 refers to table 2-4 stored in the storage unit (not shown). The PCD 2200 requests data of S0 from the remote repository 300 by using configuration information of S0 existing in table 2-4.

The remote repository 300 finds data stored in the data path of S0 and transmits the data to the PCD 2200, and the PCD 2200 provides the data to the file system 103.

When the user selects reading of the target file of jwk.jpg in the computer 100, the file system 103 finds sectors allocated to the file of jwk.jpg by referring to the F/S information.

The file system 103 transmits read instructions regarding S3 and S10 to the PCD 200 in sequence. For example, when the computer 100 transmits the instruction READ (S3) to the PCD 2200, the PCD 2200 identifies whether there is configuration information of S3 by referring to table 2-4. The PCD 2200 requests data of S3 from the remote repository 300 indicated by the data path of S3. The remote repository 300 finds data of S3 stored in a place indicated by the data path of S3, and transmits the data to the PCD 2200, and the PCD 2200 provides the data of S3 data received from the remote repository 300 to the file system 103. The computer 100 may receive data of S10 from the PCD 2200 in the same way as the data of S3.

In the embodiments of the VCD 200 and the PCD 2200, described above with reference to FIGS. 5 to 10, numbers of sectors managed in F/S information (that is, virtual space block IDs), and number of sectors transmitted to the remote repository 300 (that is, remote space block IDs) are differently implemented. Accordingly, when a data path to be transmitted to the remote repository 300 is generated, the VCD 200 and the PCD 2200 convert a virtual space block ID into a remote space block ID. Alternatively, if the virtual space block IDs and the remote space block IDs are implemented to be the same, the VCD 200 and the PCD 2200 may use a virtual space block ID as it is when generating a data path to be transmitted to the remote repository 300.

A USB storage device 200, which will be described hereinbelow with reference to FIGS. 1 to 4, may perform the operation of converting a virtual space block ID into a remote space block ID when generating a data path. Alternatively, if the virtual block IDs and the remote block IDs are implemented to be the same as each other, the USB storage device 200 may use a virtual space block ID as it is when generating a data path to be transmitted to the remote repository 300.

FIGS. 1 to 4 are views to explain a data management system using a USB-based cloud disk according to an embodiment of the present disclosure. The same reference numerals are used for the elements shown in FIGS. 1 to 4, and the elements shown in FIGS. 5 to 10 which perform the same or similar operations.

The data management system using the USB-based cloud disk (hereinafter, a 'data management system') according to an embodiment of the present disclosure may include a USB host 100, a USB storage device 200, a remote repository 300, and a wireless communication terminal 400 according to an embodiment of the present disclosure. Herein, the USB storage device 200 may be the VCD 200 described above with reference to FIGS. 5 to 9.

The USB host 100 may be a computer provided with resources (hardware and program), such as a computer processor (not shown), a memory unit (for example, a memory or a device capable of temporarily and/or permanently storing data like an HDD, a RAM or a ROM) (not shown), an operating system (not shown), a peripheral device (not shown), a file system 103. The USB host 100 may communicate with the USB storage device 200 according to USB standards.

The computer processor (not shown), the memory unit (not shown), the operating system (not shown), the peripheral device (not shown), the system 103 provided in the USB host 100 may be operatively connected with one another.

Operations of the file system 103 may be the same as or similar to the operations of the file system 103 described with reference to FIGS. 5 to 6.

The USB host 100 may transmit and receive data and/or request (command) to and/or from the USB storage device 200 through a USB connector 210.

The USB storage device 200 may include at least one computer processor 204, a memory unit (for example, a RAM 206, a ROM 208, a memory 202), a USB connector 210, and a communication unit 212. The USB storage device 200 may also include a storage space configuration management unit ('SCM') 214, a block data connection unit ('BDC') 218, a USB driver 220, and attribute/block information 216.

The storage unit (not shown) of the USB storage device 200 may temporarily or permanently store programs and data. For example, the SCM 214 and the BDC 218 may be stored and operated in the storage unit (not shown) of the USB storage device 200. In addition, the storage unit (not shown) of the USB storage device 200 may temporarily or permanently store basic data and RSC information.

The SCM 214, the BDC 218, and the program such as the USB driver 220, may be stored in the memory 202, and may be loaded into the RAM 206 under control of the processor 204 to perform their operations and may be executed. The computer processor 204 and the memory 202 of the USB storage device 200 may be operatively connected with each other, and may also be operatively connected with the communication unit 212.

The attribute/block information 216 may include virtual space configuration information and RSC information.

The attribute block information 216 may be managed (generated, deleted, changed) by the SCM 214.

The virtual space configuration information may be stored in the memory 202, and the RSC information may be stored in the memory 202 or a certain remote repository (another remote repository, not in the remote repository 300). When the RSC information is stored in a certain remote repository, the RSC information may be moved to or copied into the USB storage device 200 every time the USB storage device 200 is connected to the computer 100. The RSC information moved to or copied into the USB storage device 200 may be loaded into the RAM 260 and may be used.

The virtual space configuration information may include an address of the remote repository 300 (for example, URL), a type of the remote repository, information (a user ID, a password, a token) for logging in the remote repository 300, a type of a format, a total size of a virtual space (storage capacity provided in the USB storage device 200). The virtual space configuration information may further include a storage capacity of a block and the number of blocks. Herein, the 'block' corresponds to the 'sector' described above with reference to FIGS. 5 to 10.

The virtual space configuration information may correspond to the 'basic data' described above with reference to FIGS. 5 to 10.

F/S information includes 'file-virtual space block mapping data'. The 'file-virtual space block mapping data' is data in which a file and sectors match each other. Specifically, the 'file-virtual space block mapping data' may be data in which a file and one or more virtual space block IDs match each other. When the capacity of the file is larger than the size of the virtual space block, the file may be divided into two or more data and the divided data may match the virtual space block IDs, respectively.

The RSC information includes configuration information of a block (that is, a sector). The configuration information of the block defines a type of a remote repository for each block (that is, a store type), and a data path. For example, the virtual block ID, the type of the remote repository, and the data path match one another.

The virtual space configuration information may further include 'virtual space block-remote space block mapping data'. The 'virtual space block-remote space block mapping data' is data in which virtual space block IDs and remote space block IDs match each other.

The data path included in the RSC information includes a place to store block data, and a remote space block ID. That is, when a data path for a certain block is generated, the SCM 214 finds a remote space block ID matching a virtual space block ID by referring to the 'virtual space block-remote space block mapping data', and includes the remote space block ID in the data path of the block.

The RSC information and the F/S information have been described in detail with reference to FIGS. 5 to 10, and thus an explanation thereof is omitted.

The communication unit 212 supports communication with the remote repository 300. For example, the communication unit 212 may be hardware that supports wireless communication such as WiFi or Bluetooth communication, and a program therefor may be stored in the storage unit or may be stored in the communication unit in the form of firmware.

Herein, WiFi (Wireless Fidelity) is technology for enabling electronic devices to connect to a wireless local area network (WLAN), and refers to short-range communication technology for enabling wireless Internet within a predetermined distance by using radio waves in a place where a wireless access point (AP) is installed. In the IEEE 802.11 standards, standards for WiFi communications are defined and managed.

In addition, 'Bluetooth' is personal short range wireless communication industrial standards for digital communication devices, and refers to data communication technology for a short distance between electronic devices which uses ultra-high frequency (UHF) radio waves of 2.4-2.485 GHz included in industrial scientific medical (ISM) hands, and may be employed for the purpose of exchanging digital information, such as text information and speech information, at a relatively low speed through wireless communication in a mobile phone, a smartphone, a tablet, a speaker, as well as a mouse, a keyboard used in a personal computer. Bluetooth is registered at the IEEE under the name of IEEE 802.15.1 standard, and is managed through the Bluetooth special interest group (SIG).

The SCM 214 may generate RSC information regarding a block. For example, the SCM 214 may generate a data path regarding block data to be transmitted to the remote repository 300. When the data path is generated, the SCM 214 converts a virtual space block ID given by the file system 103 into a remote space block ID, and makes the converted remote space block ID be included in the data path.

The SCM 214 may update the RSC information. When the USB storage device 200 receives WRITE (S4, data 4)), the SCM 214 identifies whether there is configuration information of S4 in the RSC information, and, when there is no configuration information of S4, the SCM 214 generates configuration information of S4 and adds the configuration information to the RSC information.

The SCM 214 may generate the configuration information of S4 by referring to the virtual space configuration information. For example, the SCM 214 selects an available 'remote repository' included in the virtual space configuration information, allocates a remote space block ID to match the virtual space block ID, and generates a data path to store block data of S4.

When the USB storage device 200 receives READ (S3), the SCM 214 identifies whether there exists configuration information of S3 in the RSC information, and, when there exists the configuration information of S3, provides the configuration information of S3 to the BDC 218. The BDC 218 requests block data from the remote repository 300 by using the configuration information of S3.

In the present embodiment, the virtual storage space managed by the SCM 214 is not a space that physically exists within the USB storage device 200, and a real physical storage space corresponding to the virtual storage space exists in the remote repository 300.

The total size (capacity) of the virtual storage space managed by the USB storage device 200 may be set or fixed by a user. The sizes of the virtual space blocks may be defined by the user. The SCM 214 may set and manage the size of the virtual space block.

The user may set the capacity of the virtual storage space and the sizes of the virtual space blocks through an application or a browser installed in the USB host 100, and the SCM 214 may be operatively connected with the application or browser, and the SCM 214 may include the capacity of the virtual storage space and the sizes of the virtual space blocks, which are set by the user, in the attribute/block information 216, and may manage the same.

When a read command regarding a certain block (for example, S4) is received from the file system 103, the BDC 218 requests block data from the remote repository 300 by using the RSC information on the block S4, and may receive the block data from the remote repository 300.

In addition, when a write command to store data in a certain block (S5) is received from the file system 103, the SCM 214 may generate RSC information regarding block S5, and the BDC 218 may request the remote repository 300 to store block data by using the generated RSC information.

In addition, the BDC 218 provides an interface for transmitting and receiving data, a request, information such as various IDs to and from the USB driver 220, and an interface for transmitting and receiving data, a request, information such as various IDs to and from the remote repository 300.

The wireless communication terminal 400 performs a function of an AP, and receives data from the USB storage device 200 and transmit the data to the remote repository 300, and receives data from the remote repository 300 and transmits the data to the USB storage device 200.

The wireless communication terminal 400 may be provided with a function for short range communication with the USB storage device 200, and for example, may be provided with a communication function such as Bluetooth.

The wireless communication terminal 400 may be a device that is provided with a data communication function, such as a smartphone or a personal digital assistant (PDA).

The remote repository 300 is a storage device that can be connected through a communication network such as Internet, and for example, may be a storage device such as Microsoft OneDrive, NAVER Cloud, Google Cloud, Dropbox, or Baidu (These are all service marks or trademarks).

The remote repository 300 stores block data received from the USB storage device 200 in a place indicated by the data path. The remote repository 300 may use a 'remote space block ID' included in the data path as an ID of the block data. For example, when the remote repository 300 receives the data path 'https://drive.google.com/disk1/sector2', the remote repository 300 may use 'sector 2' as an ID of the block data.

Alternatively, the remote repository 300 may use other ID than the remote space block ID included in the data path as the ID of the block data. In this case, the remote repository 300 may manage matching data in which the remote space block ID and the other LD of the block data used by the remote repository 300 are matched onto each other.

According to an embodiment, the data management system may store data in the following way.

When the USB host 100 transmits block data to b stored in a block (for example, S7) to the USB storage device 200, the USB storage device 200 generates RSC information for storing the block data. The USB storage device 200 transmits the block data and a data path to the remote repository 300 through the wireless communication terminal 400. The remote repository 300 stores the data received from the USB storage device 200 in a place indicated by the data path.

According to an embodiment, the data management system may read data in the following way.

When the USB host 100 requests the USB storage device 200 to read data stored in a certain block (for example, S8), the USB storage device 200 refers to space configuration information of the block S8. Thereafter, the USB storage device 200 requests data stored in the block S8 while transmitting a data path included in the space configuration information of the block S8 to the remote repository 300. The remote repository 300 reads out data stored in the data path, and transmits the data to the USB storage device 200. The USB storage device 200 transmits the data received from the remote repository 300 to the file system 103 of the computer 100.

According to an embodiment of the present disclosure, there is provided a data management method using a USB-based cloud disk (hereinafter, a 'data management method'), and the data management method may include: a step of receiving, by a USB storage device, a write request to write data (for example, data 13) on a sector (for example, S13) from a host of the USB storage device; a step of generating RSC information regarding the sector (S13) in response to the write request; a step of transmitting a data path of the sector (S13) included in the RSC information, and the data (data 13) to a remote repository; and a step of storing, by the remote repository, the data (data 13) in a place indicated by the data path.

In addition, a data management method according to an embodiment of the present disclosure may include: a step of receiving, by a USB storage device, a request to read data stored in a sector (for example, S14) from a host of the USB storage device; a step of referring to RSC information regarding the sector (S14) in response to the read request; a step of transmitting a data path of the sector (S14) included in the RSC information to a remote repository; and a step of finding, by the remote repository, data stored in a place indicated by the data path, and providing the data to the USB storage device.

Regarding the RSC information in the above-described methods, reference is made to the explanations of FIGS. 1 to 10.

The above-described data management method may be implemented by the above-described data management system, and hereinafter, an example of the data management method applied to the above-described data management system will be described.

The memory included in the USB storage device 200 may store a program that causes the processor of the USB storage device 200 to perform the data management method of the present disclosure. The program for performing the data management method of the present disclosure includes the SCM 214 and the BDC 218.

There is provided a data management method according to an embodiment of the present disclosure, and the data management method of the present disclosure includes: a step of receiving, by a disk segment management system, a request to write data (for example, data 13) on a sector (for example, S13) from a host of a USB storage device; a step of generating, by the disk segment management system, RSC information regarding the sector (S13) in response to the write request; a step of transmitting, by the disk segment management system, a data path of the sector (S13) included in the RSC information, and the data (data 13) to a remote repository; and a step of storing, by the remote repository, the data (data 13) in a place indicated by the data path.

In addition, a data management method according to an embodiment of the present disclosure may include: a step of receiving, by a disk segment management system, a request to read data stored in a sector (for example, S14) from a host of a USB storage device; a step of transmitting, by the disk segment management system a data path of the sector (S14) included in the RSC information to a remote repository in response to the read request; and a step of finding, by the remote repository, data stored in a place indicated by the data path, and providing the data to the USB storage device.

The present disclosure is not limited to the embodiments described above, and it is obvious to those skilled in the art that various modifications and changes can be made therein without departing from the spirit and scope of the present disclosure. Accordingly, modified examples or variations should belong to the claims of the present disclosure.

What is claimed is:

1. A USB-based cloud disk comprising:
a computer processor;
a storage unit operatively connected with the computer processor;
a storage space configuration management unit configured to manage remote space configuration information;
a block data connection unit; and
a communication unit operatively connected with the computer processor,
wherein the storage space configuration management unit and the block data connection unit are loaded into the storage unit and are operated under control of the computer processor,
wherein the remote space configuration information comprises a sector ID, a remote repository to store sector data, and a data path of sector data, and the sector ID, the remote repository to store sector data, and the data path of sector data are associated with one another,
wherein the data path of sector data indicates a place in the remote repository in which the sector data is stored,
wherein the USB-based cloud disk is configured to receive a write command from a computer connected with the USB-based cloud disk,
wherein the write command comprises sector data (data 1) and an ID (S1) of a sector to store the sector data (data 1),
wherein, when the USB-based cloud disk receives the write command, the storage space configuration management unit is configured to generate configuration information of the sector (S1),
wherein the configuration information of the sector (S1) comprises a remote repository to which the sector data (data 1) is transmitted, and a data path to store the sector data (data 1),
wherein the block data connection unit is configured to transmit the sector data (data 1) and the data path of the sector data (data 1) to the remote repository included in the configuration information of the sector (S1) through the communication unit.

2. The USB-based cloud disk of claim 1, wherein the storage space configuration management unit is configured to identify whether there exists configuration information of the sector (S1) in the remote space configuration information, prior to generating the configuration information of the sector (S1), and, when there does not exist the configuration information of the sector (S1), to generate the configuration information of the sector (S1), and to perform an updating operation to add the generated configuration information of the sector (S1) to the remote space configuration information.

3. The USB-based cloud disk of claim 2, wherein the sector data (data 1) and the data path of the sector data (data 1) that are transmitted to the remote repository by the block data connection unit are acquired from the updated remote space configuration information.

4. The USB-based cloud disk of claim 2, wherein the USB-based cloud disk is configured to receive a read command from a computer connected with the USB-based cloud disk,
wherein the read command comprises an ID (S3) of a sector to be read,
wherein, when the read command is received after the updating operation is completed, the storage space configuration management unit is configured to identify whether there exists configuration information of the sector (S3) in the updated remote space configuration information,
wherein, when there exists the configuration information of the sector (S3), the block data connection unit is configured to transmit the data path of the sector (S3) to the remote repository included in the configuration information of the sector (S3) through the communication unit, and to receive data stored in the data path of the sector (S3) from the remote repository through the communication unit, and
wherein the USB-based cloud disk is configured to transmit the received data to the computer which transmits the read command through the communication unit.

5. The USB-based cloud disk of claim 2, wherein the USB-based cloud disk is configured to receive a read command from the computer connected with the USB-based cloud disk,
wherein the read command comprises an ID (S0) of a sector to be read, wherein, when the read command is received before the updating operation is completed, the storage space configuration management unit is configured to identify whether there exists configuration information of the sector (S0) in the remote space configuration information before updating, wherein, when there does not exist the configuration information of the sector (S0), the storage space configuration management unit is configured to generate the configuration information of the sector (S0) and to perform an updating operation to add the configuration information of the sector to the remote space configuration information before updating, and wherein the configuration information of the sector (S0) comprises a remote repository to which sector data (data 0) to be stored in the sector (S0) is transmitted, and a data path to store the sector data (data 0).

6. The USB-based cloud disk of claim 1, wherein the data path to store the sector data (data 1) comprises a place to store the sector data (data 1) and a remote space block ID regarding the sector data (data 1), and wherein the ID (S1) of the sector included in the write command is a virtual space block ID, and wherein the virtual space block ID and the remote space block ID are mapped onto each other.

* * * * *